（12）United States Patent
Oike

(10) Patent No.: US 10,086,553 B2
(45) Date of Patent: Oct. 2, 2018

(54) BLOW MOLD UNIT AND BLOW MOLDING DEVICE USING SAME

(71) Applicant: NISSEI ASB MACHINE CO., LTD., Nagano (JP)

(72) Inventor: Toshiteru Oike, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 15/706,406

(22) Filed: Sep. 15, 2017

(65) Prior Publication Data

US 2018/0169926 A1   Jun. 21, 2018

Related U.S. Application Data

(63) Continuation of application No. PCT/JP2016/057360, filed on Mar. 9, 2016.

(30) Foreign Application Priority Data

Mar. 17, 2015  (JP) ................................ 2015-053916

(51) Int. Cl.
*B29C 49/42* (2006.01)
*B29C 49/48* (2006.01)
(Continued)

(52) U.S. Cl.
CPC .......... *B29C 49/30* (2013.01); *B29C 49/4236* (2013.01); *B29C 49/56* (2013.01);
(Continued)

(58) Field of Classification Search
CPC ........ B29C 49/4236; B29C 2049/4869; B29C 2049/563; B29C 49/56; B29C 2049/4858;
(Continued)

(56) References Cited

U.S. PATENT DOCUMENTS 3,809,517 A * 5/1974 Schneider ............... B29C 49/06
425/533
4,303,381 A * 12/1981 Aoki ....................... B29C 49/20
264/511

(Continued)

FOREIGN PATENT DOCUMENTS

JP    06-038750    2/1993
JP    2004-188866    7/2004
(Continued)

OTHER PUBLICATIONS

International Search Report in corresponding PCT/JP2016/057630, dated Jun. 7, 2016.

*Primary Examiner* — Robert B Davis
(74) *Attorney, Agent, or Firm* — Finnegan, Henderson, Farabow, Garrett & Dunner, LLP

(57) ABSTRACT

In a fixing member 110 formed with an insertion hole 113 for inserting an elevation rod 111, a communication hole 114 communicating with the insertion hole 113 is formed to open at a side surface of the fixing member 110. A key member 112 is inserted into the communication hole 114 and engaged with a key groove 118 provided at the distal end of the elevation rod 111. By so doing, the elevation rod 111 and the fixing member 110 are coupled together.

12 Claims, 11 Drawing Sheets

(51) Int. Cl.
*B29C 49/56* (2006.01)
*B29C 49/30* (2006.01)
*B29C 49/70* (2006.01)

(52) U.S. Cl.
CPC ...... *B29C 49/70* (2013.01); *B29C 2049/4869* (2013.01); *B29C 2049/563* (2013.01)

(58) Field of Classification Search
CPC .......... B29C 2049/4856; B29C 33/305; B29C 33/307
See application file for complete search history.

(56) References Cited

U.S. PATENT DOCUMENTS

| | | | | |
|---|---|---|---|---|
| 5,496,166 | A | * | 3/1996 | Vogel .................. B29C 33/303 425/168 |
| 8,915,729 | B2 | * | 12/2014 | Zoppas ................ B29C 33/306 425/182 |
| 2006/0068048 | A1 | * | 3/2006 | Koda .................... B29C 49/06 425/3 |
| 2007/0048399 | A1 | * | 3/2007 | Fields .................. B29C 49/42 425/190 |
| 2014/0291877 | A1 | * | 10/2014 | Takahashi ............ B29C 49/56 264/39 |
| 2015/0343697 | A1 | * | 12/2015 | Takehana .............. B29C 49/48 425/538 |

FOREIGN PATENT DOCUMENTS

| | | | | |
|---|---|---|---|---|
| JP | 2011-156728 | | 8/2011 | |
| JP | 2013-086355 | | 5/2013 | |
| JP | 2013-086500 | | 5/2013 | |
| JP | 2013-107391 | | 6/2013 | |
| WO | WO-2013058340 A1 | * | 4/2013 | ............ B29C 49/48 |
| WO | WO 2016-147981 | | 9/2016 | |

* cited by examiner

INSERTION/EXTRACTION DIRECTION

BLOW MOLD UNIT AND BLOW MOLDING DEVICE USING SAME

This application, is a Continuation of PCT International Application No. PCT/JP2016/057360, filed on Mar. 9, 2016, which claims priority under 35 U.S.C. 119(a) to Patent Application No. 2015-053916, filed in Japan on Mar. 17, 2015, all of which are hereby expressly incorporated by reference into the present application.

TECHNICAL FIELD

This invention relates to a blow mold unit having an ascendable/descendable bottom mold, and a blow molding device using the blow mold unit.

BACKGROUND ART

Conventional methods for molding hollow containers made of synthetic resins include, for example, a technology which obtains a preform by injection molding or extrusion, and blow-molds the preform by a blow mold unit provided in a blow molding device to form a hollow container. A known example is a technology in which a preform is disposed within a molding space (cavity) formed by a blow mold provided in a blow mold unit, and the preform is blow-molded within this cavity for expansion to form a hollow container (see, for example, Patent Document 1).

PRIOR ART DOCUMENTS

Patent Documents

Patent Document 1: JP-A-2013-107391

SUMMARY OF THE INVENTION

Problems to be Solved by the Invention

Such blow molding devices use many types of molds, and require a lot of time for mounting, dismounting and replacing operations for the molds, for example, as compared with injection molding devices. A blow mold unit for molding a hollow container whose bottom surface defines a push-up bottom, for example, is equipped with a blow cavity mold composed of a pair of split molds, and a bottom mold of a predetermined shape configured to be ascendable and descendable by means of a raising/lowering device. An operation for mounting, dismounting, or replacing such a bottom mold needs a particularly long time.

In detail, the mounting, dismounting or replacement of the bottom mold requires a complicated operation, such as crawling under the bottom mold and fastening a metal fitting within a narrow space provided after the blow cavity mold is opened. This poses the problem that the work efficiency is low and the working hours tend to be long.

In producing many models in small lots, moreover, the number of replacements of the molds increases, thus imposing a heavy burden on the replacing operation.

The present invention has been accomplished in the light of the above-described circumstances. It is an object of the invention to provide a blow mold, unit, which can improve the operating efficiency of mounting, dismounting or replacement of an ascendable and descendable bottom mold to achieve a reduction in working hours, and a blow molding device using the blow mold unit.

Means for Solving the Problems

A first aspect of the present invention, which solves the above problems, resides in a blow mold unit comprising: a blow cavity mold including a pair of split molds to be mold-clamped upon contact of parting surfaces thereof with each other, and forming a molding space for molding a hollow container having a push-up bottom; a bottom mold for forming a bottom surface of the molding space; a fixing member having an upper surface side to which the bottom mold is fixed, and a lower surface side to which an elevation rod provided in a raising/lowering device is connected; and a key member coupling the elevation rod and the fixing member together, wherein an insertion hole for inserting the elevation rod is formed to open on the lower surface side of the fixing member, a communication hole communicating with the insertion hole is formed to open at a side surface of the fixing member, and the key member is inserted into the communication hole and engaged with a key groove provided at a distal end of the elevation rod, whereby the elevation rod and the fixing member are coupled together.

A second aspect of the present invention resides in the blow mold unit according to the first aspect, further comprising a restraint member provided at an opening peripheral edge of the communication hole of the fixing member, and provided with a rotating member pivotable between a first position where a distal end thereof opposes the communication hole and a second position where the distal end thereof lies outside the fixing member, wherein the restraint member is rotated from the second position to the first position, with the key member being inserted into the communication hole and kept in engagement with the elevation rod, whereby the key member is restrained from moving backward.

A third aspect of the present invention resides in the blow mold unit according to the second aspect, wherein the key member is formed with an engagement groove opposing the restraint member at a predetermined position where the engagement of the key member with the elevation rod is released after the key member is moved backward in the communication hole and, at the predetermined position, the rotating member is rotated from the second position to the first position, whereby the key member is engaged with the engagement groove and the key member is restrained from moving.

A fourth aspect of the present invention resides in the blow mold unit according to any one of the first to third aspects, wherein a plurality of the bottom molds arranged in a row are fixed to the fixing member, the elevation rods are connected to both ends of the fixing member in a row direction of the bottom molds, and the communication holes are open at both end surfaces of the fixing member in the row direction of the bottom molds.

A fifth aspect of the present invention resides in a blow molding device comprising: the blow mold unit according to any one of the first to fourth aspects; the raising/lowering device for raising and lowering the bottom mold, and a drive device for moving the split molds to mold-clamp and mold-open the blow cavity mold.

Effects of the Invention

According to the present invention, the operating efficiency of mounting, dismounting or replacement of a bottom mold coupled to an elevation rod of a raising/lowering device can be improved to achieve a reduction in working hours.

MODE FOR CARRYING OUT THE INVENTION

An embodiment of the present invention will now be described in detail by reference to the accompanying drawings.

Figure 1:
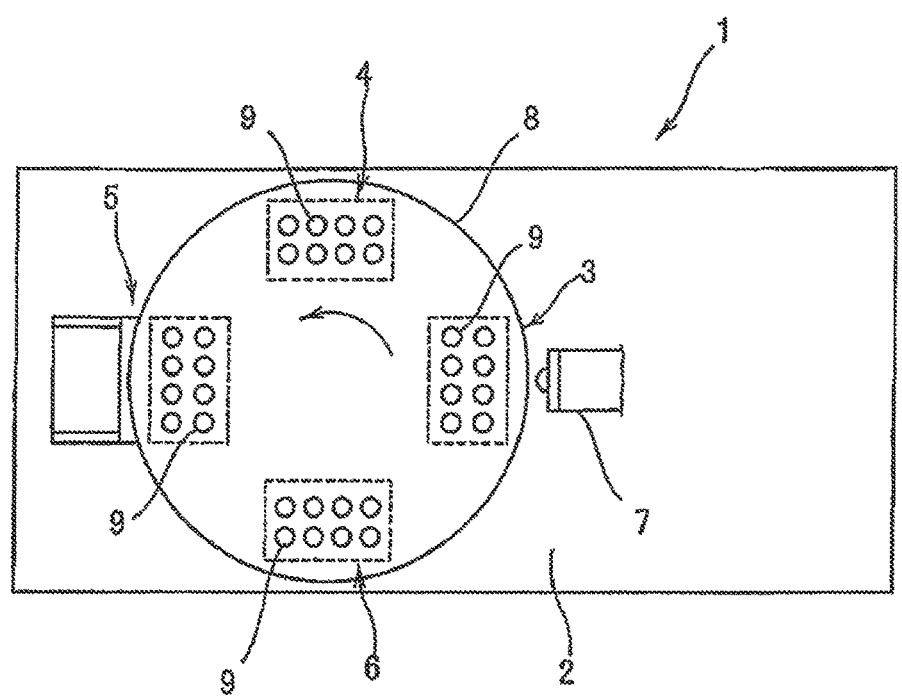
FIG. 1 is a view showing the schematic configuration of an injection blow molding device according to an embodiment of the present invention.

First of all, an explanation will be offered for the schematic configuration of an injection blow molding apparatus equipped with a blow molding device according to the present invention. As shown in FIG. 1, an injection blow molding apparatus 1 is an apparatus for producing, for example, a hollow container made of a synthetic resin, such as a PET bottle. This apparatus has an injection molding device 3, a temperature control device 4, a blow molding device 5, and a withdrawal device 6 provided on a machine base 2.

A nozzle 7 of an injection device is coupled to the injection molding device 3. In the injection molding device 3, a preform is formed from a resin material injected from the nozzle 7. In the temperature control device 4, the temperature of the preform is adjusted to a desired temperature. In the blow molding device 5, the temperature-adjusted preform is biaxially stretch blow-molded to form a hollow container which is a final molded product. The so formed hollow container is withdrawn to the outside by the withdrawal device 6.

A rotating disk 8 is provided above the injection molding device 3, the temperature control device 4, the blow molding device 5, and the withdrawal device 6. The rotating dish 8 is, for example, intermittently rotatable counterclockwise with respect to the machine base 2. Lip molds 3 are provided at four locations in the circumferential direction of the rotating disk 8. The preform and the hollow container are held by the lip molds 9 and transported to the predetermined device sequentially by the intermittent rotation of the rotating disk 8.

The present invention is characterized by the configuration of the blow molding device 5 constituting the above-described injection blow molding apparatus 1, particularly, by the configuration of the blow mold unit. The blow molding device 5 will be described in detail below.

Figure 2:
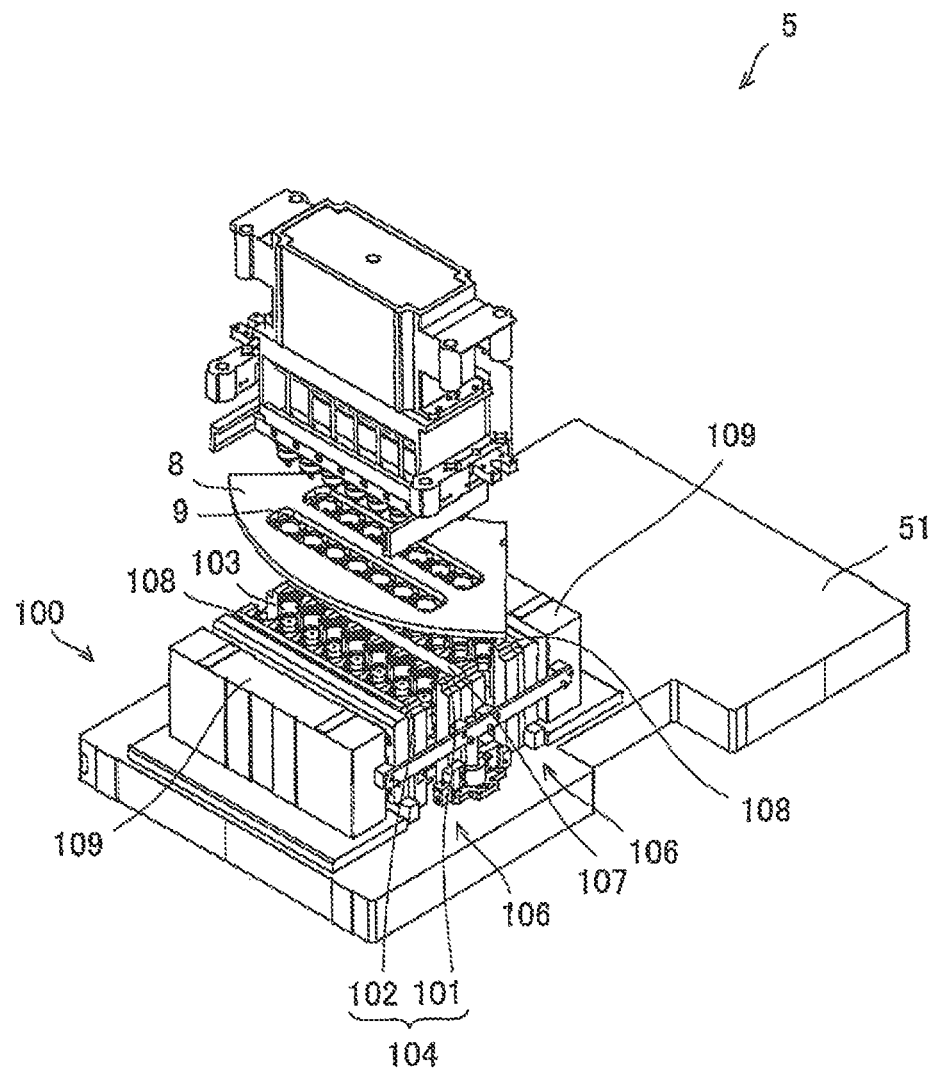
FIG. 2 is a perspective view showing the schematic configuration of a blow molding device according to the embodiment of the present invention.
Figure 3:
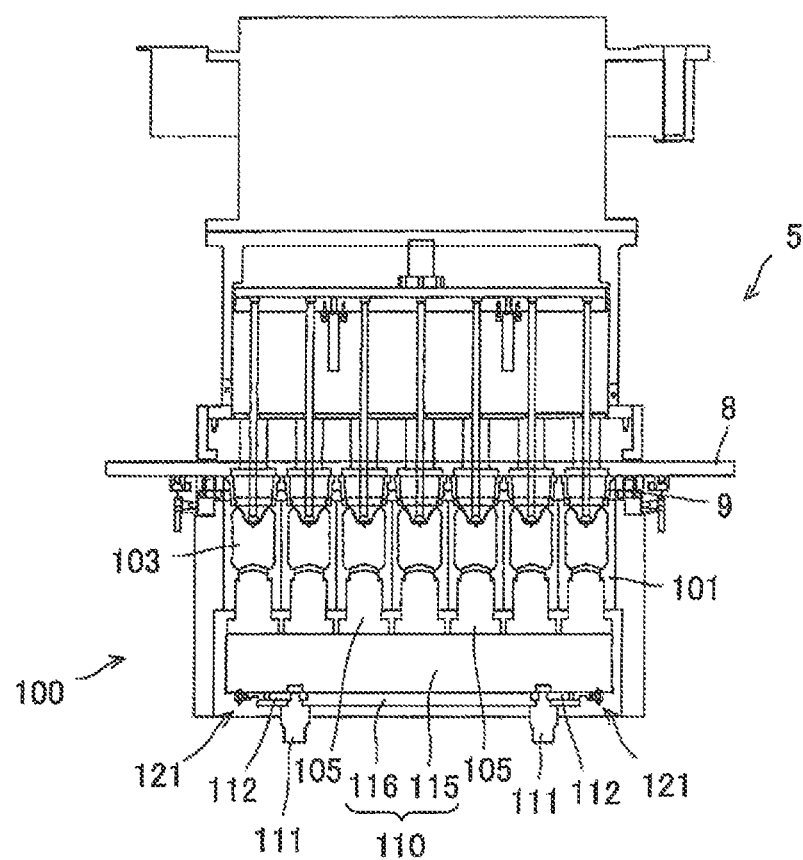
FIG. 3 is a front view showing the schematic configuration, of the blow molding device according to the embodiment of the present invention.

FIG. 2 is a perspective view showing the schematic configuration of the blow molding device including the blow mold unit. FIG. 3 is a plan view showing the schematic configuration of the blow mold unit. As shown in FIGS. 2 and 3, the blow molding device 5 is equipped with a blow mold unit 100 mounted on a lower base 51. A blow core mold or the like is provided above the blow mold unit 100, but its detailed explanation will be omitted here, because its configuration is an existing one.

The blow mold unit 100 is equipped with a blow mold 106 composed of a blow cavity mold 104 which has a first split mold 101 and a second split mold 102 to be mold-clamped when their parting surfaces are contacted with each other, and which defines a plurality of molding spaces (cavities) 103 accommodating, for example, the preforms; and a bottom mold 105 closing the bottom of each cavity 103 and forming the bottom surface (push-up bottom) of a hollow container as a final product.

The blow mold unit 100 further has a first fixing plate 107 to which the first split mold 101 is fixed, and a second fixing plate 108 to which the second spilt mold 102 is fixed. In the present embodiment, the blow mold unit 100 includes two of the blow molds 106, and thus has the single first fixing plate 107, and two of the second fixing plates 108 provided on both sides of the first fixing plate 107. The two first split molds 101 constituting the respective blow molds 106 are fixed, back to back, to the first fixing plate 107. On the other hand, the second split molds 102 constituting the blow molds 106 are fixed to the two second fixing plates 108, respectively.

Outside each second fixing plate 108, a drive device 103 for mold-clamping/mold-opening the blow cavity mold 104 is provided which is constituted, for example, by a hydraulic cylinder (actuator). In the present embodiment, these drive devices 109 are coupled to the second fixing plates 108 to which the second split molds 102 are fixed. The drive device 109 moves the second split mold 102 to mold-clamp/mold-open the blow cavity mold 104.

The bottom mold 105 constituting the blow mold 106 is provided in correspondence with each cavity 103. The plurality of bottom molds 105 are supported to be movable upward and downward by a raising/lowering device (not shown) constituted, fox example, by a hydraulic cylinder (actuator).

Concretely, the plurality of bottom molds 105 provided in the blow mold unit 100 are fixed to an upper surface of a third fixing plate (fixing member) 110 to be integrated therewith, as shown in FIG. 3. The third fixing plate 110 is coupled to a plurality of (two in the present embodiment) elevation rods 111 constituting the raising/lowering device (not shown). That is, the plurality of bottom molds 105 are coupled via the third fixing plate 110 to the elevation rods 111 constituting the raising/lowering device so as to be ascendable and descendable.

In the present embodiment, the plurality of bottom molds 105 arranged in a row axe fixed to the third fixing plate 110, and the two elevation rods 111 are coupled to sites near both ends of the third fixing plate 110 in the row direction of the bottom molds 105.

Figure 4:
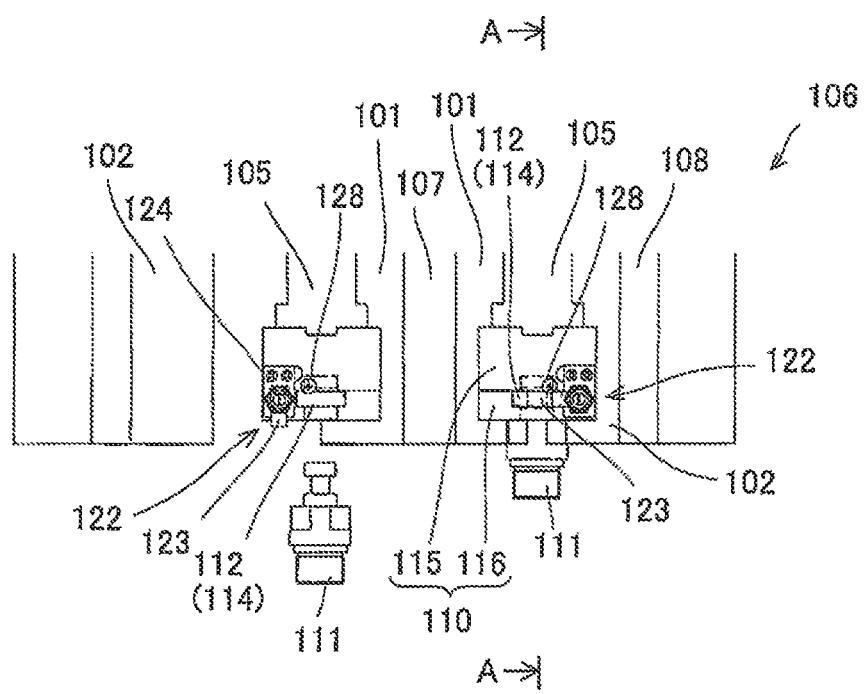
FIG. 4 is a side view showing essential parts of a blow mold unit according to the embodiment of the present invention.
Figure 5:
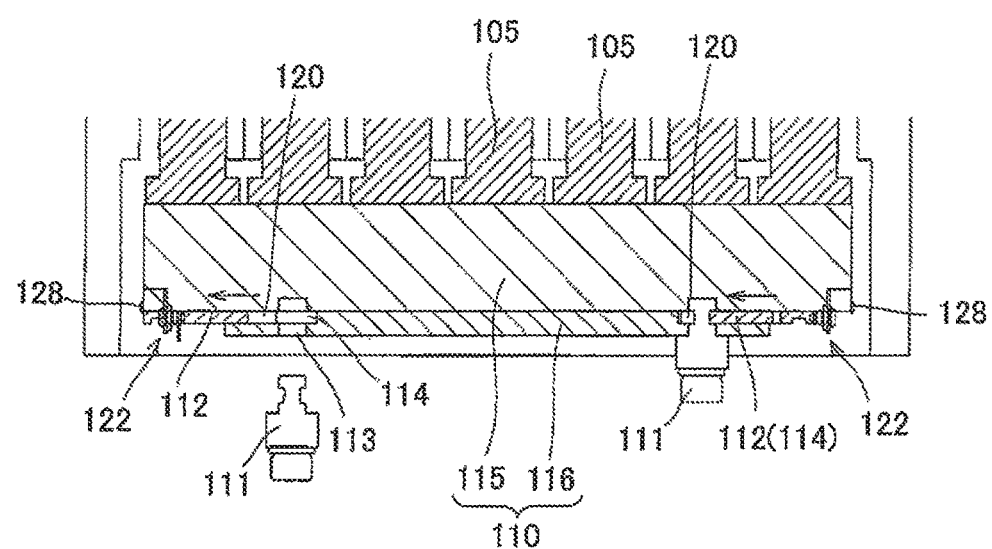
FIG. 5 is a sectional view showing the essential parts of the blow mold unit according to the embodiment of the present invention.
Figure 6:
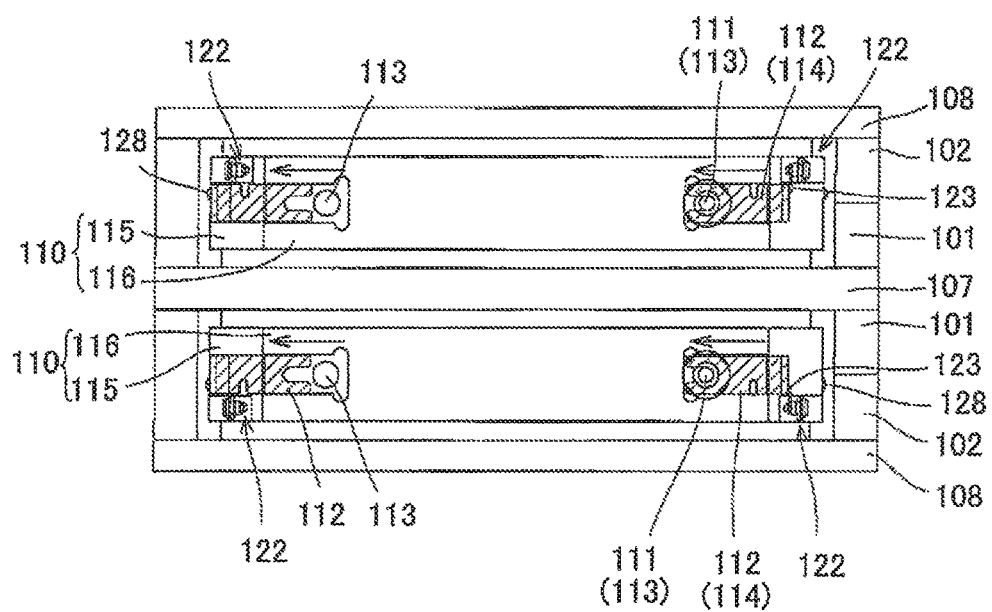
FIG. 6 is a bottom view showing the blow mold unit according to the embodiment of the present invention.

Next, a structure for coupling these elevation rods 111 and the third fixing plate 110 will be described by reference to FIGS. 4 to 6. FIGS. 4 to 6 are views showing a portion coupling the third fixing plate 110 and the elevation rod 111 constituting the blow mold unit 100, FIG. 4 being a view corresponding to the side surface of the blow mold unit. FIG. 5 being a view corresponding to a cross section taken on line A-A in FIG. 4, and FIG. 6 being a view corresponding to the bottom surface of the blow mold unit. In FIGS. 4 to 6, a state where the elevation rod is coupled to the third fixing plate is shown on the right side of the drawing, while a state where their coupling is released is shown on the left side of the drawing.

In the blow mold unit 100 according to the present invention, as shown in FIGS. 4 and 6, each elevation rod ill is coupled (fixed) to the third fixing plate 110 by a key member 112. Detailedly, in the third fixing plate 110, an insertion hole 113 for inserting the elevation rod 111 is formed to open on the lower surface side, at a position corresponding to each elevation rod 111. In the third fixing plate 110, moreover, a communication hole 114 communicating with the insertion hole 113 is formed to open at the side surface of the third fixing plate 110. In the present embodiment, the communication holes 114 are provided to open at both side surfaces (end surfaces) of the third fixing plate 110 in the row direction of the bottom molds 105. The communication hole 114 is a hole for insertion of the key member 112, and is formed in conformity with the shape of the key member 112.

The third fixing plate 110 is formed by two base plates, an upper base plate 115 and a lower base plate 116, in the present embodiment. The upper base plate 115 and the lower base plate 116 are fixed, for example, by a fastening member such as a bolt, although it is not shown. The insertion hole 113 is formed to penetrate the lower base plate 116 and to a depth reaching a part of the upper base plate 115. The communication hole 114 is provided at a boundary surface between the upper base plate 115 and the lower base plate 116. By closing a groove, which has been provided at the surface of the lower base plate 116, with the upper base plate 115, for example, the communication hole 114 is formed.

Figure 7:
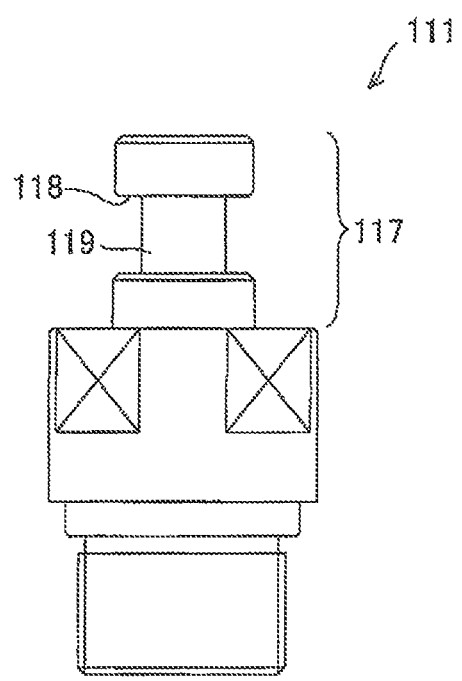
FIG. 7 is a view showing an example of an elevation rod according to the embodiment of the present invention.

The elevation rod 111 has a coupling portion 117 of a smaller diameter than other portions at the distal end (upper end) thereof, as shown in FIG. 7. The elevation rod 111 is coupled to the third fixing plate 110, with the coupling portion 117 being inserted into the insertion hole 113 (see FIG. 5, etc.). In the coupling portion 117 of the elevation rod 111, a key groove 118 is formed at a position opposing the communication hole 114 when the coupling portion 117 is inserted into the insertion hole 113. The key groove 118 is formed along the circumferential direction and, in the present embodiment, is formed over the entire circumference of the elevation rod 111. In other words, a part of the coupling portion. 117 corresponding to the key groove 118 defines a small-diameter portion. 119 of a smaller diameter than the other parts of the coupling portion 117.

Figure 8A:
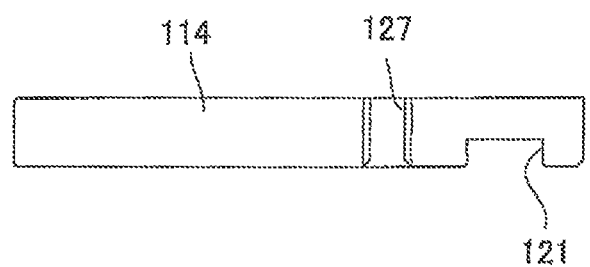
FIGS. 8(a), 8(b) are views showing an example of a key member according to the embodiment of the present invention.
Figure 8B:
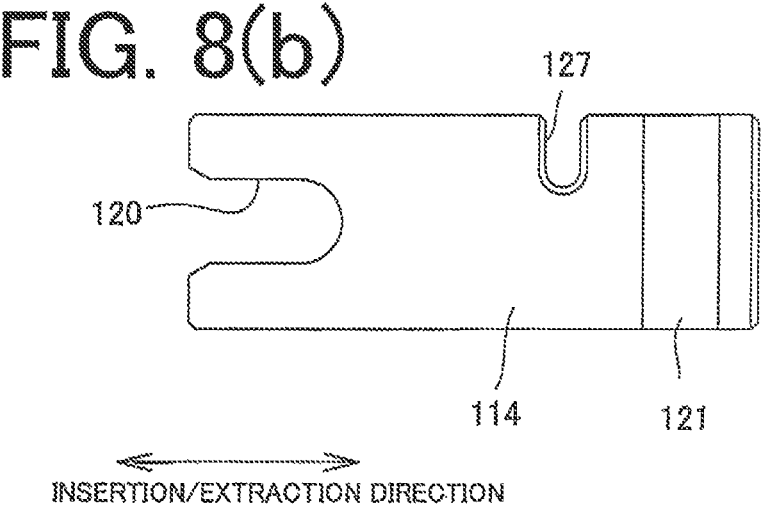

The key member 112, as shown in FIGS. 8(a), 8(b), is a plate-shaped member in a nearly oblong planar shape and having a predetermined thickness. At the end of the key member 112 on the side for insertion into the communication hole 114 formed in the third fixing plate 110, a slit 120 is formed along the direction of insertion/extraction. In a lower surface of the key member 112, a dent 121 is formed near the end on the side opposite to the slit 120. This dent 121 is utilized when the key member 112 is extracted from the communication hole 114.

In coupling the elevation rod 111 to the third fixing plate 110, the key member 112 is inserted into the communication hole 114 of the third fixing plate 110, with the elevation rod 111 being inserted into the insertion hole 113, and the key member 112 is pushed into the communication hole 114 until the small-diameter portion 113 of the elevation rod 111 is engaged with the slit 120, as shown on the right side of FIGS. 4 to 6. By so doing, the movement in the vertical direction of the elevation rod 111 is restrained, and the elevation rod 111 is fixed to the third fixing plate 110. That is, the key member 112 is engaged with the key groove 118 of the elevation rod 111, whereby the elevation rod 111 and the third fixing plate 110 are coupled together.

In the present embodiment, the upper base plate 115 constituting the third fixing plate 110 is extended up to the outside of the end surface of the lower base plate 116, where the communication hole 114 is open, in the insertion/ extraction direction of the key member 112 (in the present embodiment, in the row direction of the bottom molds 105). Thus, when the key member 112 is to be inserted into the communication hole 114, the key member 112 is slid in contact with the lower surface of the upper base plate 115, whereby the key member 112 can be easily inserted into the communication hole 114.

In the third fixing plate 110, moreover, a locking member (restraint member) 122 for restraining the movement (forward or backward movement) of the key member 112 inserted into the communication hole 114 is provided at the peripheral edge of the opening of the communication hole 114. The looking member 122 includes a rotating member (rotating plate) 123 provided to be rotatable along the end surface of the lower base plate 116 constituting the third fixing plate 110 (opening surface of the communication hole 114). The rotating member 123 is mounted on a holding plats 124.

Figure 9A:
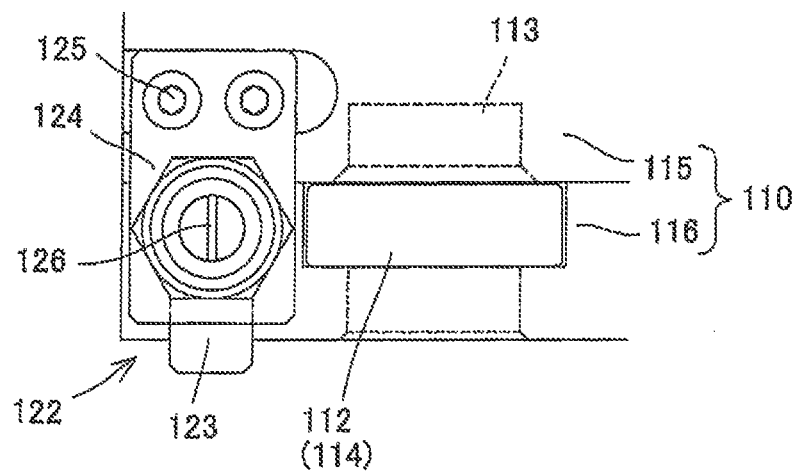
FIGS. 9(a), 9(b) are views showing an example of a locking member according to the embodiment of the present invention.
Figure 9B:
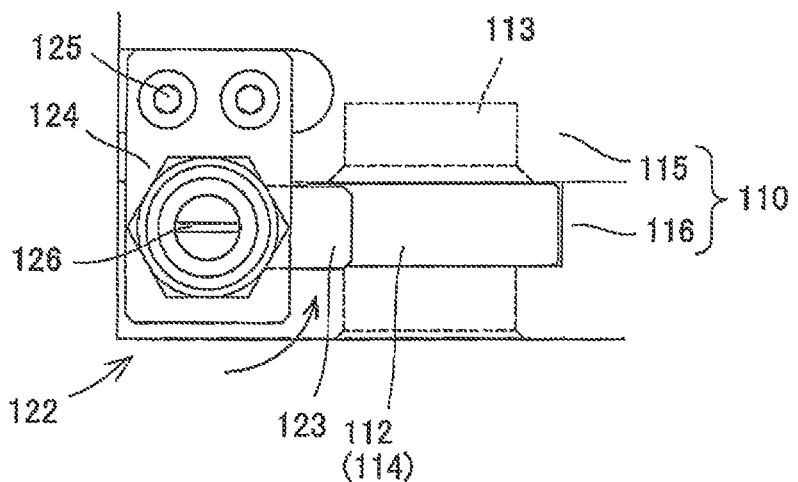

The holding plate 124 is, for example, fixed to the upper base plate 115 by fastening members 125 so as to protrude toward the lower base plate 116 at a position not opposing the communication hole 114. The rotating member 123 is pivotable between a first position where its distal end opposes the communication hole 114 and a second position where its distal end lies outwardly of the communication hole 114. In the present, embodiment, for example, the rotating member 123 is rotatable in a 90° range from the second position where the rotating member 123 faces vertically downwardly as shown in FIG. 9(a), to the first position where the rotating member 123 heads in the horizontal direction as shown in FIG. 9(b). The direction of rotation of the rotating member 123 differs according to the position of its mounting. The rotating member 123 is fitted to the holding plate 124 while being coupled to and integrated with a rotation operating member 126. By rotating the rotation operating member 126 using a flat-blade screwdriver, for example, the rotating member 123 is rotated together with the rotation operating member 126.

When the key member 112 is inserted into the communication hole 114 until it is engaged with the elevation rod 111, as described above, the rotating member 123 of the locking member 122 is rotated from the second position to the first position (FIG. 9(b)). By so doing, the backward movement of the key member 112 is restrained, and the state of coupling between the elevation rod 111 and the third fixing plate 110 can be held reliably.

When the rotating member 123 is located at the first position, the rotating member 123 may be displaced toward the second position owing to the weight of the rotating member 123 itself or under the influence of vibrations during machine operation. In this case, the key member 112 may slide, so that the coupling between the elevation rod 111 and the third fixing plate 110 may be released. To avoid this event, the locking member (looking mechanism) 122 is structured such that the rotating member 123 cannot be rotated, unless a push-in part on the rotation operating member 126 (a part where a groove for a screwdriver is present) is pressed by a tool such as a flat-blade screwdriver.

When it is intended to release the state of coupling between the elevation rod 111 and the third fixing plate 110, for example, for replacement of the bottom mold 105, a first step is to rotate the rotating member 123 of the locking member 122 from the first position to the second position (FIG. 9(a)). Then, the key member 112 is retreated within the communication hole 114 to release the state of coupling between the elevation rod 111 and the third fixing plate 110 (see the left side of FIG. 6). Then, the elevation rod 111 is pulled out of the insertion hole 113 (see the left side of FIGS. 4 and 5), whereby the third fixing plate 110 having the bottom mold 105 fixed thereto can be separated from the raising/lowering device (elevation rod 111) relatively easily. That is, simply by pulling out the key member 112 from the side surface of the third fixing plate 110, the state of coupling (the state of engagement) between the third fixing plate 110 and the elevation rod 111 can be easily released. Hence, the operating efficiency of replacement of the bottom mold 105 is increased, and the working hours can be reduced.

With the conventional blow molding device, the elevation rod has been fixed to the lower surface side of the third fixing plate by a fastening member or the like. In replacing the above bottom mold, therefore, an operator has needed to enter a narrow space below the bottom mold or the like and work there. Thus, the operating efficiency has been poor, and the working hours have been lengthened. With the blow molding device 5 according to the present invention, on the other hand, the work during entry in the space below the bottom mold 105 is unnecessary, so that the operating efficiency is improved, and the working hours are shortened.

Figure 10:
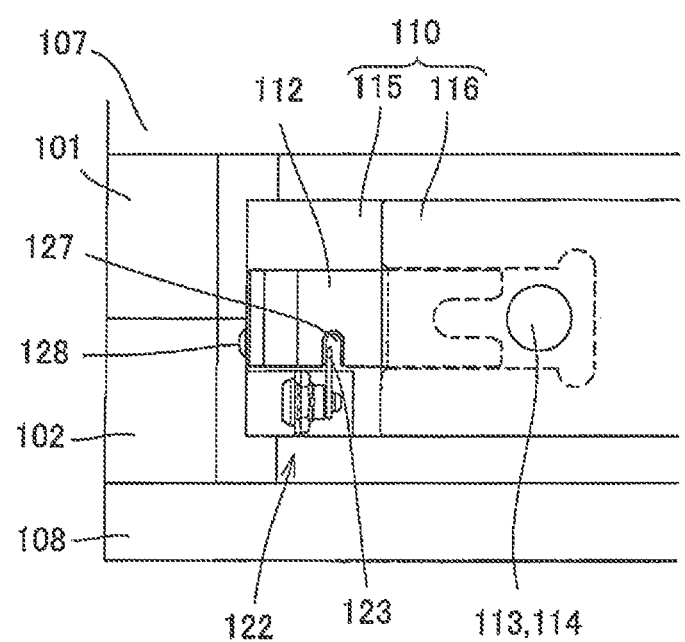
FIG. 10 is a view showing essential parts of a bottom surface of the blow mold unit according to the embodiment of the present invention, the view illustrating the state of engagement of a rotating member with an engagement groove.

In the present embodiment, moreover, an engagement groove 127 is formed in the key member 112, at a site opposing the rotating member 123 of the locking member 122, at a predetermined position where the key member 112 has been retreated and disengaged from the elevation rod 111 (see FIGS. 8(a), 8(b)). When the key member 112 has been retreated within the communication hole 114 to the position of its disengagement from the elevation rod 111, the rotating member 123 is rotated from the second position to the first position, whereby the rotating member 123 is engaged with the engagement groove 127, as shown in FIG. 10. As a result, the movement (forward and backward movements) of the key member 112 within the communication hole 114 is restrained. Thus, at the time of replacement or the bottom mold 105, for example, the third fixing plate 110 to which the bottom mold 105 is fixed is easy to transport. Consequently, the operating efficiency during work such as replacement of the bottom mold 105 can be further improved.

In the present embodiment, moreover, a screw member 128 as a second restraint member for restraining the backward movement of the key member 112 from the predetermined position is provided in the upper base plate 115 constituting the third fixing member 110 (see FIG. 5). The screw member 128 is attached to the upper base plate 115, with a part of its head protruding downwardly from the surface (lower surface) of the upper base plate 115. Since the screw member 128 is provided, the engagement of the key member 112 with the elevation rod 111 can be released more easily. That is, the key member 112 is moved backward until it contacts the screw member 128, whereby the engagement of the key member 112 with the elevation rod 111 can be released, without dropping out the key member 112. Furthermore, at the position, of the contact of the key member 112 with the screw member 128, the rotating member 123 of the locking member 122 is rotated, as mentioned above, whereby the rotating member 123 is engaged with the engagement groove 127. Hence, the operating efficiency during work such as the replacement of the bottom mold 105 is further increased.

The one embodiment of the present invention has been described as above, but it is to be understood that the present invention is in no way limited to this embodiment. The present invention can be changed or modified, as appropriate, without departing from its spirit and scope.

Figure 11A:
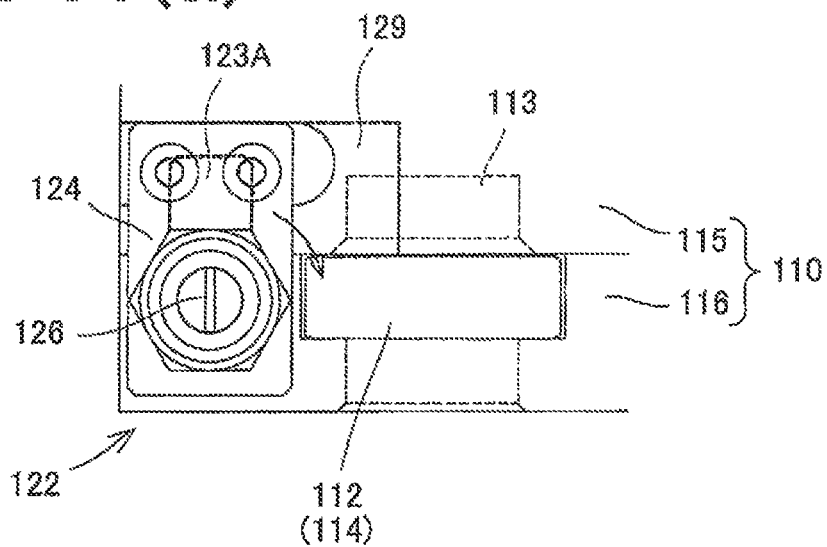
FIGS. 11(a), 11(b) are views showing a modification of the locking member according to the embodiment of the present invention.
Figure 11B:
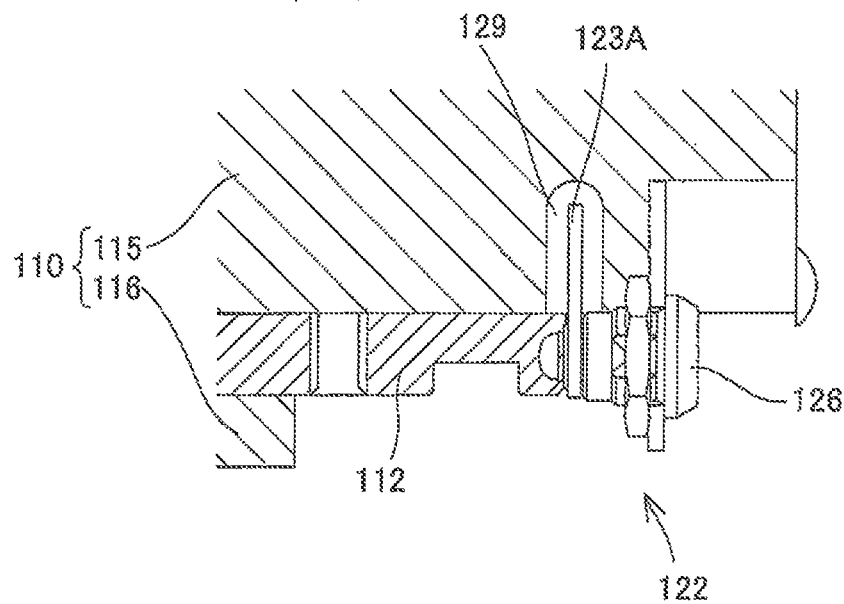

For example, the foregoing embodiment illustrates, as an example of the locking member 122, a configuration including the rotating member 123 rotatable in a range from the second position where the rotating member 123 faces vertically downwardly to the first position where the rotating member 123 is pointed horizontally. However, the configuration of the locking member 122 is not limited to this configuration. For example, a rotating member 123A provided in the locking member 122 may be configured to be rotatable between a second position where the rotating member 123A faces vertically upwardly to a first position where the rotating member 123A is pointed horizontally (see FIG. 9(b)), as shown in FIGS. 11(a), 11(b). If the locking member 122 has the rotating member 123A, an insertion groove 129 for insertion of the rotating member 123A needs to be formed in the upper base plate 115.

Because of such a configuration, the rotating member 123A is not exposed to the outside, but accommodated within the insertion groove 129, at the first position. In this state, a problem such that when the fixing member 110 is transported, for example, the rotating member 123A collides with an obstacle and becomes damaged (deformed) can be prevented from occurring.

The above embodiment, for example, illustrates the configuration provided with the locking member (restraint member) and the screw member (second restraint member). However, the locking member and the screw member are not essential features, and need not necessarily be provided.

The embodiment illustrates the blow mold unit having the plurality of cavities provided in two rows. However, the present invention can be applied, for example, to a blow mold unit having a plurality of cavities provided in a row.

In the embodiment, the communication hole for insertion of the key member is formed to open at the end surface of the third fixing member in the row direction of the bottom mold. It goes without saying, however, that the communication hole may be provided to open at the end surface of the third fixing member in a direction orthogonal to the row direction of the bottom molds.

In the embodiment, moreover, the blow molding device having the two elevation rods is illustrated. However, the present invention can be applied to a blow molding device having 3 or more of the elevation rods.

EXPLANATIONS OF LETTERS OR NUMERALS

1 Injection blow molding apparatus
2 Machine base

3 Injection molding device
4 Temperature control device
5 Blow molding device
6 Withdrawal device
7 Nozzle
8 Rotating disk
9 Lip mold
51 Lower base
100 Blow mold unit
101 First split mold
102 Second split mold
103 Cavity (molding space)
104 cavity mold
105 Bottom mold
106 Blow mold
107 First Fixing plate
108 Second fixing plate
109 Drive device
110 Third fixing plate (fixing member)
111 Elevation rod
112 Key member
113 Insertion hole
114 Communication hole
115 Upper base plate
116 Lower base plate
117 Coupling portion
118 Key groove
119 Small-diameter portion
120 Slit
121 Dent
122 Locking member (restraint member)
123 Rotating member
124 Holding plate
125 Fastening member
126 Rotation operating member
127 Engagement groove
128 Screw member (second restraint member)
129 Insertion groove

The invention claimed is:

1. A blow mold unit, comprising:
a blow cavity mold including a pair of split molds to be mold-clamped upon contact of parting surfaces thereof with each other, and forming a molding space for molding a hollow container having a push-up bottom;
a bottom mold for forming a bottom surface of the molding space;
a fixing member having an upper surface side to which the bottom mold is fixed, and a lower surface side to which an elevation rod provided in a raising/lowering device is connected; and
a key member coupling the elevation rod and the fixing member together,
wherein an insertion hole for inserting the elevation rod is formed to open on the lower surface side of the fixing member, and a communication hole communicating with the insertion hole is formed to open at a side surface of the fixing member, and
the key member is inserted into the communication hole and engaged with a key groove provided at a distal end of the elevation rod, whereby the elevation rod and the fixing member are coupled together.

2. The blow mold unit according to claim 1, further comprising
a restraint member provided at an opening peripheral edge of the communication hole of the fixing member, and provided with a rotating member pivotable between a first position where a distal end thereof opposes the communication hole and a second position where the distal end thereof lies outside the fixing member,
wherein the restraint member is rotated from the second position to the first position, with the key member being inserted into the communication hole and kept in engagement with the elevation rod, whereby the key member is restrained from moving backward.

3. The blow mold unit according to claim 2, wherein
the key member is formed with an engagement groove opposing the restraint member at a predetermined position where the engagement of the key member with the elevation rod is released after the key member is moved backward in the communication hole, and
at the predetermined position, the rotating member is rotated from the second position to the first position, whereby the key member is engaged with the engagement groove and the key member is restrained from moving.

4. The blow mold unit according to claim 1, wherein
a plurality of the bottom molds arranged in a row are fixed to the fixing member,
the elevation rods are connected to both ends of the fixing member in a row direction of the bottom molds, and
the communication holes are open at both end surfaces of the fixing member in the row direction of the bottom molds.

5. The blow mold unit according to claim 2, wherein
a plurality of the bottom molds arranged in a row are fixed to the fixing member,
the elevation rods are connected to both ends of the fixing member in a row direction of the bottom molds, and
the communication holes are open at both end surfaces of the fixing member in the row direction of the bottom molds.

6. The blow mold unit according to claim 3, wherein
a plurality of the bottom molds arranged in a row are fixed to the fixing member,
the elevation rods are connected to both ends of the fixing member in a row direction of the bottom molds, and
the communication holes are open at both end surfaces of the fixing member in the row direction of the bottom molds.

7. A blow molding device, comprising:
the blow mold unit according to claim 1;
the raising/lowering device for raising and lowering the bottom mold; and
a drive device for moving the split molds to mold-clamp and mold-open the blow cavity mold.

8. A blow molding device, comprising:
the blow mold unit according to claim 2;
the raising/lowering device for raising and lowering the bottom mold; and
a drive device for moving the split molds to mold-clamp and mold-open the blow cavity mold.

9. A blow molding device, comprising:
the blow mold unit according to claim 3;
the raising/lowering device for raising and lowering the bottom mold; and
a drive device for moving the split molds to mold-clamp and mold-open the blow cavity mold.

10. A blow molding apparatus, comprising:
the blow mold unit according to claim 4;
the raising/lowering device for raising and lowering the bottom mold; and
a drive device for moving the split molds to mold-clamp and mold-open the blow cavity mold.

11. A blow molding device, comprising:
the blow mold unit according to claim 5;
the raising/lowering device for raising and lowering the bottom mold; and
a drive device for moving the split molds to mold-clamp and mold-open the blow cavity mold.

12. A blow molding device, comprising:
the blow mold unit according to claim 6;
the raising/lowering device for raising and lowering the bottom mold; and
a drive device for moving the split molds to mold-clamp and mold-open the blow cavity mold.

* * * * *